(12) United States Patent
Kwon et al.

(10) Patent No.: US 12,495,290 B2
(45) Date of Patent: Dec. 9, 2025

(54) ELECTRONIC DEVICE FOR PERFORMING MOBILITY MANAGEMENT OF USER TERMINAL, AND OPERATION METHOD OF ELECTRONIC DEVICE

(71) Applicant: Samsung Electronics Co., Ltd., Suwon-si (KR)

(72) Inventors: Daeken Kwon, Suwon-si (KR); Wansu Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 18/327,477

(22) Filed: Jun. 1, 2023

(65) Prior Publication Data

US 2023/0308973 A1    Sep. 28, 2023

Related U.S. Application Data

(63) Continuation of application No. PCT/KR2021/013627, filed on Oct. 5, 2021.

(30) Foreign Application Priority Data

Dec. 1, 2020  (KR) .................. 10-2020-0165953

(51) Int. Cl.
*H04W 8/18* (2009.01)
*H04W 36/08* (2009.01)

(52) U.S. Cl.
CPC ........... *H04W 8/186* (2013.01); *H04W 36/08* (2013.01)

(58) Field of Classification Search
CPC ....... H04W 8/186; H04W 36/08; H04W 8/02; H04W 88/12; H04W 36/0055; H04W 8/08; H04W 36/38; H04W 60/00; H04W 88/18

See application file for complete search history.

(56) References Cited

U.S. PATENT DOCUMENTS 10,798,556 B2   10/2020   Kim et al.
10,980,071 B2    4/2021   Xin et al.
(Continued)

FOREIGN PATENT DOCUMENTS

| CN | 111565418 A | 8/2020 |
| KR | 20200100000 A | 8/2020 |
| WO | 2022011862 A1 | 1/2022 |

OTHER PUBLICATIONS

Extended European Search Report dated Apr. 8, 2024 for EP Application No. 21900788.7.

*Primary Examiner* — Khoa Huynh (74) *Attorney, Agent, or Firm* — Nixon & Vanderhye P.C.

(57) ABSTRACT

An electronic device may include: at least one application using information related to a user terminal; and a subscription manager, wherein the subscription manager may be configured to: receive, from the application, a subscription request for collecting information of the user terminal; perform at least one operation for subscribing a first base station connected to the user terminal; receive, from the first base station, information indicating that handover to a second base station of the user terminal is performed; perform at least one operation for subscribing the second base station, in response to receiving the information indicating that the handover is performed; and perform at least one operation for releasing subscription with the first base station. Other various embodiments are possible.

15 Claims, 7 Drawing Sheets

(56) References Cited

U.S. PATENT DOCUMENTS

| | | |
|---|---|---|
| 11,102,691 B2 | 8/2021 | Gronstad et al. |
| 11,184,838 B2 | 11/2021 | Park et al. |
| 2009/0046655 A1 | 2/2009 | Zhao et al. |
| 2012/0264451 A1 | 10/2012 | Kim et al. |
| 2014/0086177 A1* | 3/2014 | Adjakple .............. H04W 74/04 370/329 |
| 2015/0341802 A1 | 11/2015 | Chiang et al. |
| 2016/0374134 A1* | 12/2016 | Kweon ................... H04W 4/70 |
| 2020/0267596 A1 | 8/2020 | Sudarsan et al. |
| 2020/0314719 A1 | 10/2020 | Tofighbakhsh et al. |
| 2021/0185585 A1* | 6/2021 | Chen ................. H04W 36/0027 |

\* cited by examiner

ELECTRONIC DEVICE FOR PERFORMING MOBILITY MANAGEMENT OF USER TERMINAL, AND OPERATION METHOD OF ELECTRONIC DEVICE

CROSS-REFERENCE TO RELATED APPLICATIONS

This application is a continuation of International Application No. PCT/KR2021/013627 filed on Oct. 5, 2021, designating the United States, in the Korean Intellectual Property Receiving Office, and claiming priority to KR Patent Application No. 10-2020-0165953 filed on Dec. 1, 2020, in the Korean Intellectual Property Office, the disclosures of all of which are hereby incorporated by reference herein in their entireties.

BACKGROUND

Field

Various example embodiments relate to an electronic device and/or operation method thereof and, more for example, to a technology for performing mobility management of a user terminal.

Description of Related Art

Since the commercialization of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems are being considered for implementation not only in the band used by LTE (e.g., band below 6 GHz) but also in an ultra-high frequency (mmWave) band (e.g., band above 6 GHz). Technologies such as beamforming, massive multiple-input multiple-output (massive MIMO), full dimensional MIMO (FD-MIMO), array antennas, analog beamforming, and large scale antennas are being discussed for 5G communication systems.

Base stations providing mobile communication services have been implemented in an integrated form where the digital or distributed unit (DU) and the radio or remote unit (RU) of a base station are installed together at a cell site. However, since the base station in which the DU and RU are implemented in an integrated form is not suitable for the needs of mobile communication operators who want to build multiple cell sites according to the increase in users and traffic, a centralized radio access network (RAN) or cloud RAN (C-RAN) architecture has emerged.

The C-RAN has a structure in which DUs are centrally placed at one physical location and only RUs are left at cell sites that actually transmit and receive radio signals with terminals, and the DU and the RU can be connected with optical cables or coaxial cables. In addition, as the RU and DU are separated, an interface standard for communication between them is required, and a standard such as common public radio interface (CPRI) is currently used between the RU and the DU.

Further, such a base station architecture is being standardized in 3GPP (3rd Generation Partnership Project), and Open Radio Access Network (O-RAN) is being studied as an open network standard that can be applied to 5G systems.

The O-RAN system may be a network system implemented based on the O-RAN standard, where functions that can be performed by a base station (eNB) of an existing 4G mobile communication system and a base station (gNB) of a 5G mobile communication system are implemented in a logically separated way. The O-RAN system may include a RAN intelligent controller (RIC) between the base station and the core network for performing various management including resource allocation. The RIC is a component for improving the quality of service used by a user terminal and can provide optimal cellular communication to the user terminal through optimization of components and resources of the O-RAN system.

SUMMARY

The RIC may include an application capable of providing various services to a user terminal. For example, to optimize components and resources of the O-RAN system, the application may perform various operations based on information related to the location of a user terminal. To this end, the application may implement a mobility management function for a user terminal for receiving information related to the location of the user terminal.

However, if an application is implemented to perform a subscription procedure or unsubscription procedure, the complexity of implementing the application may increase. Further, if the number of applications implemented on the RIC increases, the load of the electronic device may increase due to transmission or reception of various signals generated according to subscription or unsubscription procedures of applications.

An electronic device according to various example embodiments may include: at least one application that uses information related to a user terminal; and a subscription manager, wherein the subscription manager may be configured to: receive a subscription request from the application for collecting information about the user terminal; perform at least one operation for subscription to a first base station connected, directly or indirectly, to the user terminal; receive, from the first base station, information indicating a handover of the user terminal to a second base station; perform, in response to receiving the information indicating handover occurrence, at least one operation for subscription to the second base station; and perform at least one operation for unsubscription from the first base station.

An operation method of an electronic device according to various example embodiments may include: receiving, from at least application utilizing information related to a user terminal, a subscription request for collecting information about the user terminal; performing at least one operation for subscription to a first base station connected, directly or indirectly, to the user terminal; receiving, from the first base station, information indicating a handover of the user terminal to a second base station; performing, in response to receiving the information indicating handover occurrence, at least one operation for subscription to the second base station; and performing at least one operation for unsubscription from the first base station.

In the electronic device and/or operation method thereof according to various example embodiments, a function related to mobility management of a user terminal may be implemented on a separate subscription manager other than an application. Accordingly, since the application does not perform a subscription procedure or unsubscription procedure, complexity of implementing the application may be reduced.

In the electronic device and/or operation method thereof according to various example embodiments, a function related to mobility management of a user terminal may be implemented on a separate subscription manager other than an application. Accordingly, the number of signals transmitted/received in a subscription procedure or unsubscription procedure may be reduced, thereby saving resources of the electronic device.

DETAILED DESCRIPTION

Figure 1:
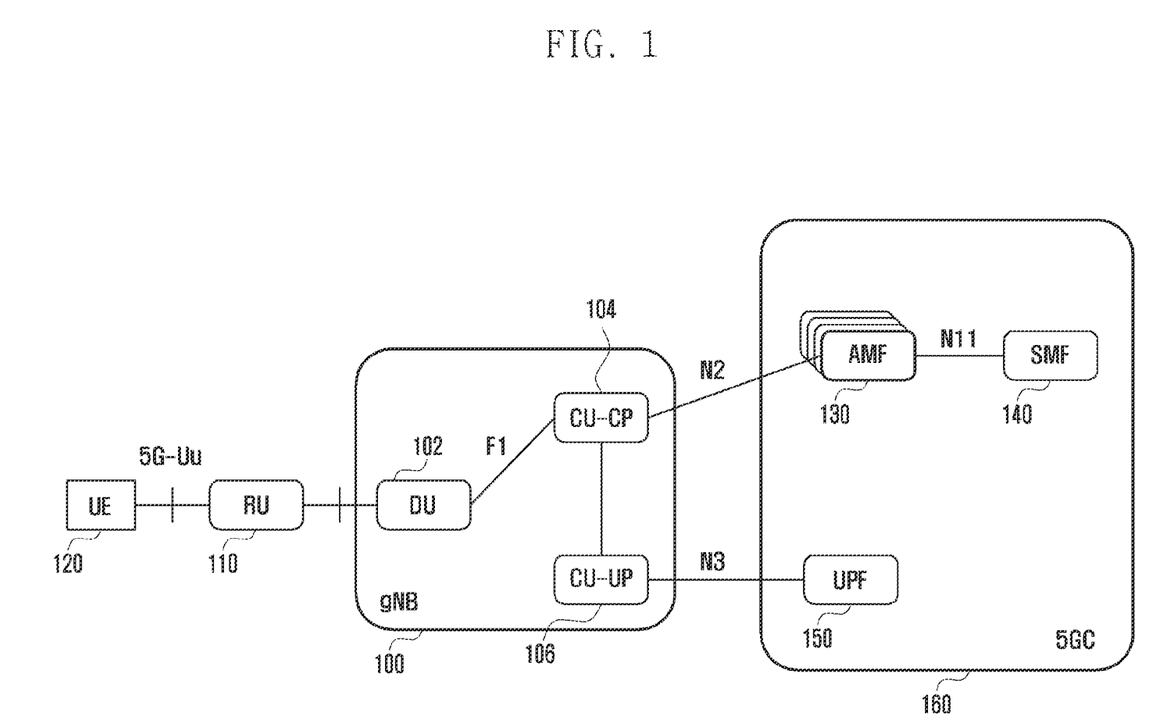
FIG. 1 is a diagram illustrating an example 5G NR core system.

FIG. 1 is a diagram illustrating a 5G NR core system.

FIG. 1 illustrates a 5G NR core system. The core network 160 may include network functions including an access and mobility management function (AMF) 130, a session management function (SMF) 140, and a user plane function (UPF) 150. Components in the core network 160 may be physically or software implemented components.

According to various example embodiments, the AMF 130 may provide a function for managing access and mobility per user equipment (UE) 120. The AMF 130 may perform a registration procedure of the UE 120 on a cellular communication network, mobility management of the UE 120 (e.g., location identification of UE 120), and connection management between the UE 120 and the cellular communication network.

According to various example embodiments, the SMF 140 may perform a session management operations such as session establishment, modification or release, and IP address allocation for a UE, and including a procedure for transmitting or receiving data between the UE 120 and the core network 160.

According to various example embodiments, the UPF 150 may receive user data transmitted by the UE 120 through the base station 100 and forward the received user data to an external server. The UPF 150 may transmit user data received from an external server to the UE 120 through the base station 100.

According to various example embodiments, the base station 100 (e.g., 5G mobile communication base station (gNB) or 4G mobile communication base station (eNB)) may include at least one component as a logical function among a radio unit (RU) 110 performing a physical layer function, a digital unit (DU) 102 responsible for medium access control (MAC) and radio link control (RLC) functions, a central unit-control plane (CU-CP) 104 responsible for higher layer functions such as radio resource control (RRC) and packet data convergence protocol (PDCP), and a central unit-user plane (CU-UP) 106. Those components in the base station 100 may be physically or software-implemented components.

According to various example embodiments, the CU-CP 104 may be a component that performs functions related to the control plane. The CU-CP 104 may be a component that performs functions related to connection setup between the UE 120 and the base station 100, and mobility and security of the UE 120.

According to various example embodiments, the CU-UP 104 may be a function related to the user plane and perform functions related to user data transmission and reception. The base station 100 may be connected, directly or indirectly, to the AMF 130, and one or more instances of AMF 130 may be implemented on the core network 160.

Figure 2:
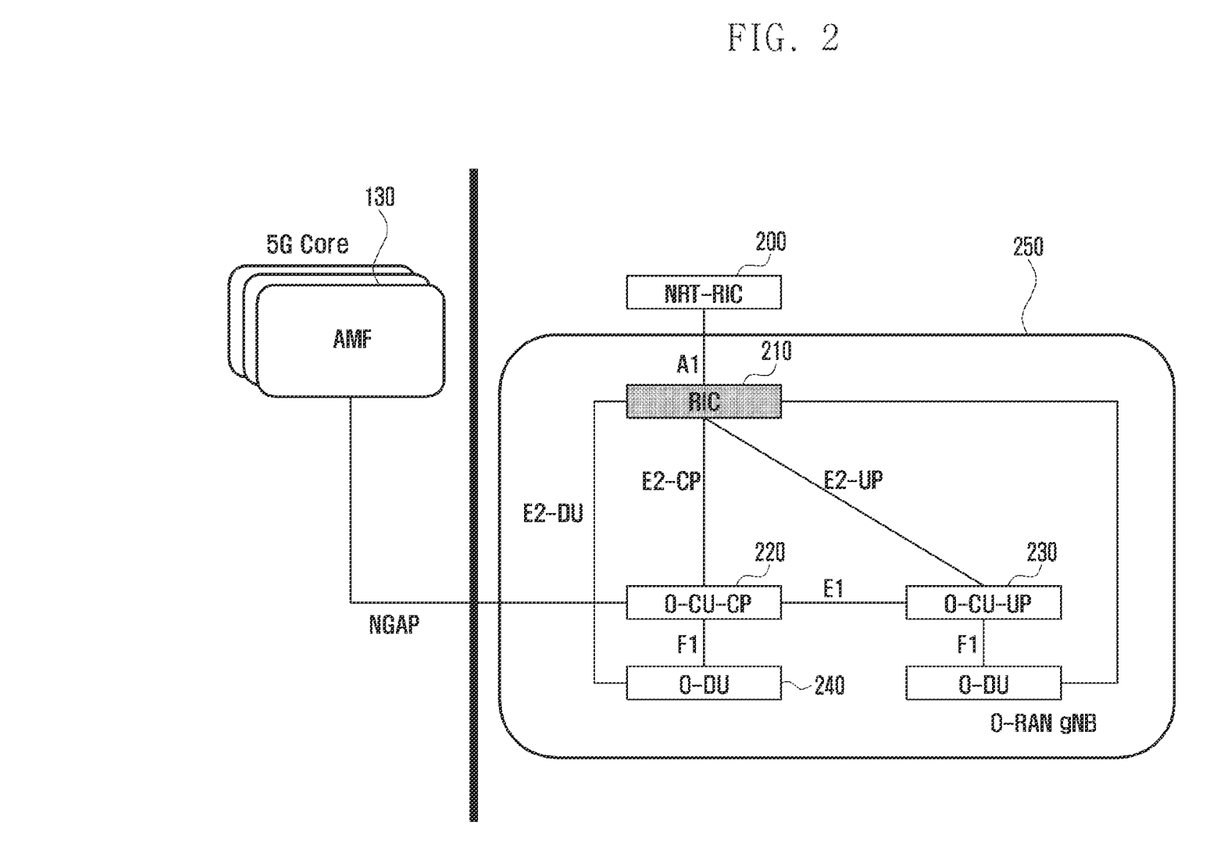
FIG. 2 is a diagram illustrating an example O-RAN network system.

FIG. 2 is a diagram illustrating an open radio access network (O-RAN) system.

FIG. 2 illustrates an O-RAN system. The O-RAN system may be a network system implemented based on the O-RAN standard, where functions that can be performed by a base station (eNB) of an existing 4G mobile communication system and a base station (gNB) of a 5G mobile communication system are implemented in a logically separated way. "Based on" as used herein covers based at least on.

In the O-RAN standard, NRT-RIC (non-real time RAN intelligent controller) 200, RIC ((near-real-time) RAN intelligent controller) 210, O-CU-CP 220, O-CU-UP 230, O-DU 240 have been newly defined.

The O-CU-CP 220 may be a logical component that provides functions of the control plane part of RRC and PDCP. The O-CU-UP 230 may be a logical component that provides functions of the user plane part of SDAP and PDCP. The O-CU-CP 220 and/or the O-CU-UP 230 may be implemented as an O-CU being an integrated component.

According to various example embodiments, the O-DU 240 may be a logical component that provides functions of RLC, MAC, and high physical layer (high-PHY based on 7-2x fronthaul split). Although not shown in FIG. 2, the O-RU connected, directly or indirectly, to the O-DU 240 may be a logical component that provides functions of low physical layer (low-PHY based on 7-2x fronthaul split) and RF processing (e.g., signal amplification and/or modulation).

According to various example embodiments, the NRT-RIC 200 may be a logical component that enables non-real-time control, optimization of RAN elements and resources, model training and update, or the like. The RIC 210 may be a logical component that enables near-real-time control and optimization of RAN elements and resources based on data collected through E2 interfaces from the O-DU 240, the O-CU-CP 220, and the O-CU-UP 230.

The disclosure is not limited by the names of the components described above, and the configuration of the disclosure can be applied to logical components that perform the functions described above. In addition, logical components may be physically located at the same location or different locations, and functions of a logical component may be provided by the same physical device (e.g., processor, controller) or may be provided by different physical devices. For example, the function of at least one logical component described above may be provided by one physical device through virtualization.

Figure 3:
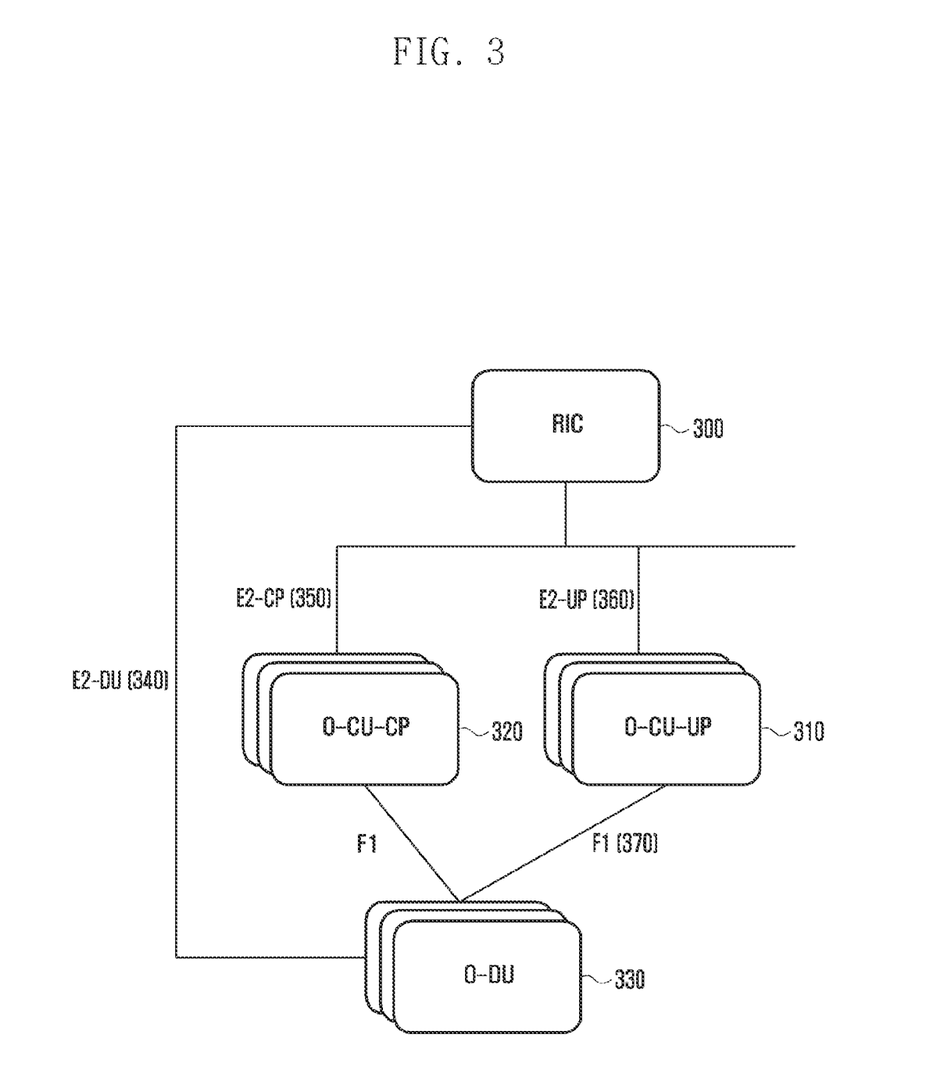
FIG. 3 is a diagram illustrating example connections between the O-RAN RIC and multiple instances of O-CU-CP, O-CU-UP and O-DU.

FIG. 3 is a diagram illustrating connections between the RIC and multiple instances of O-CU-CP, O-CU-UP and O-DU in an O-RAN system.

With reference to FIG. 3, the RIC 300 may be connected, directly or indirectly, to multiple instances of O-CU-CP 320, O-CU-UP 310, and O-DU 330.

The interface between the RIC 300 and the O-DU 330 may be defined as E2-DU 340. The interface between the RIC 300 and the O-CU-CP 320 may be defined as E2-CP 350. The interface between the RIC 300 and the O-CU-UP 310 may be defined as E2-UP 360.

The interface between the O-CU-CP 320 and the O-DU 330 may be defined as F1. The interface between the O-CU-UP 310 and the O-DU 330 may be defined as F1 370.

Although one RIC 300 is shown in FIG. 3, the O-RAN system may be implemented to include multiple RICs. Multiple RICs may be implemented with plural pieces of hardware located at the same physical location or with one piece of hardware using virtualization.

Figure 4:
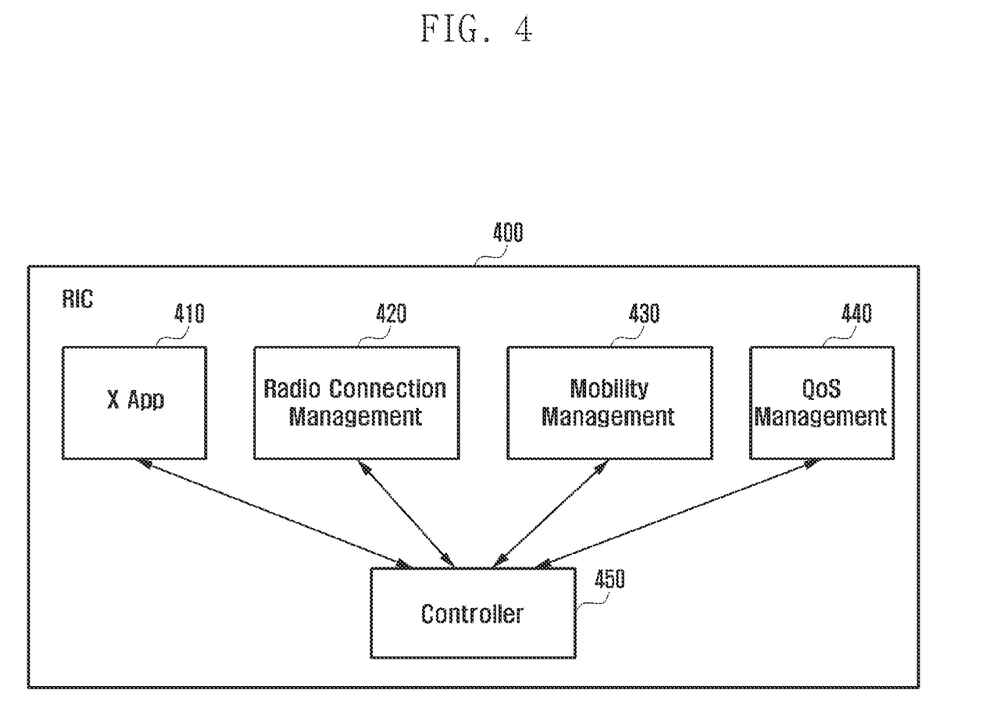
FIG. 4 is a block diagram of an electronic device according to various example embodiments.

FIG. 4 is a block diagram of an electronic device according to various example embodiments.

With reference to FIG. 4, the electronic device 400 (e.g., RIC 300 in FIG. 3) may include an application 410, radio connection management 420, mobility management 430, quality-of-service (QoS) management 440, and/or a controller 450. The components shown in FIG. 4 may be logically and/or physically implemented components.

According to various example embodiments, the application 410 may be a component implemented in the electronic device 400 and performing various functions. The application 410 may perform various functions based on information related to the UE (e.g., UE 120 in FIG. 1) (e.g., location of UE 120 or base station connected to UE 120).

According to various example embodiments, the radio connection management 420 may be a component that performs functions related to connection between the UE 120 and the base station (e.g., base station 100 in FIG. 1). The radio connection management 420 may perform connection management between the UE 120 and the core network (e.g., core network 160 in FIG. 1).

According to various example embodiments, the mobility management 430 may be a component that performs functions related to mobility management of the UE 120 (e.g., location identification of UE 120).

According to various example embodiments, the QoS management 440 may perform an operation of specifying a path to be used by the UE 120 among one or more paths existing between the core network 160 and the UE 120 according to the characteristics (QoS) of the service used by the UE 120.

According to various example embodiments, the controller 450 may control various components (e.g., application 410, radio connection management 420, mobility management 430, and/or QoS management 440) implemented on the electronic device 400. The controller 450 may receive a signal requesting data or functionality required for a specific operation of the application 410 from the application 410. Upon receiving the request signal from the application 410, the controller 450 may make a request for specific data or functionality to a component that can provide data or functionality required by the application 410 (e.g., radio connection management 420, mobility management 430, and/or QoS management 440). Upon receiving specific data, the controller 450 may forward the received data to the application 410 or may control a specific component to perform the corresponding function.

According to an embodiment, to perform a specific operation (e.g., executing a specific function that can use the location of the UE 120), the application 410 may make a request for the location of the UE 120 to the controller 450. Through a subscription procedure with a base station (e.g., base station 100 in FIG. 1) connected, directly or indirectly, to the UE 120, the controller 450 may receive the location of the UE 120 from the base station 100. The controller 450 may transmit information related to the location of the UE 120 received from the base station 100 to the application 410. The application 410 may perform the specific function by using information related to the location of the UE 120 received from the controller 450. A specific embodiment of obtaining the location of the UE 120 will be described later with reference to FIG. 5.

Figure 5:
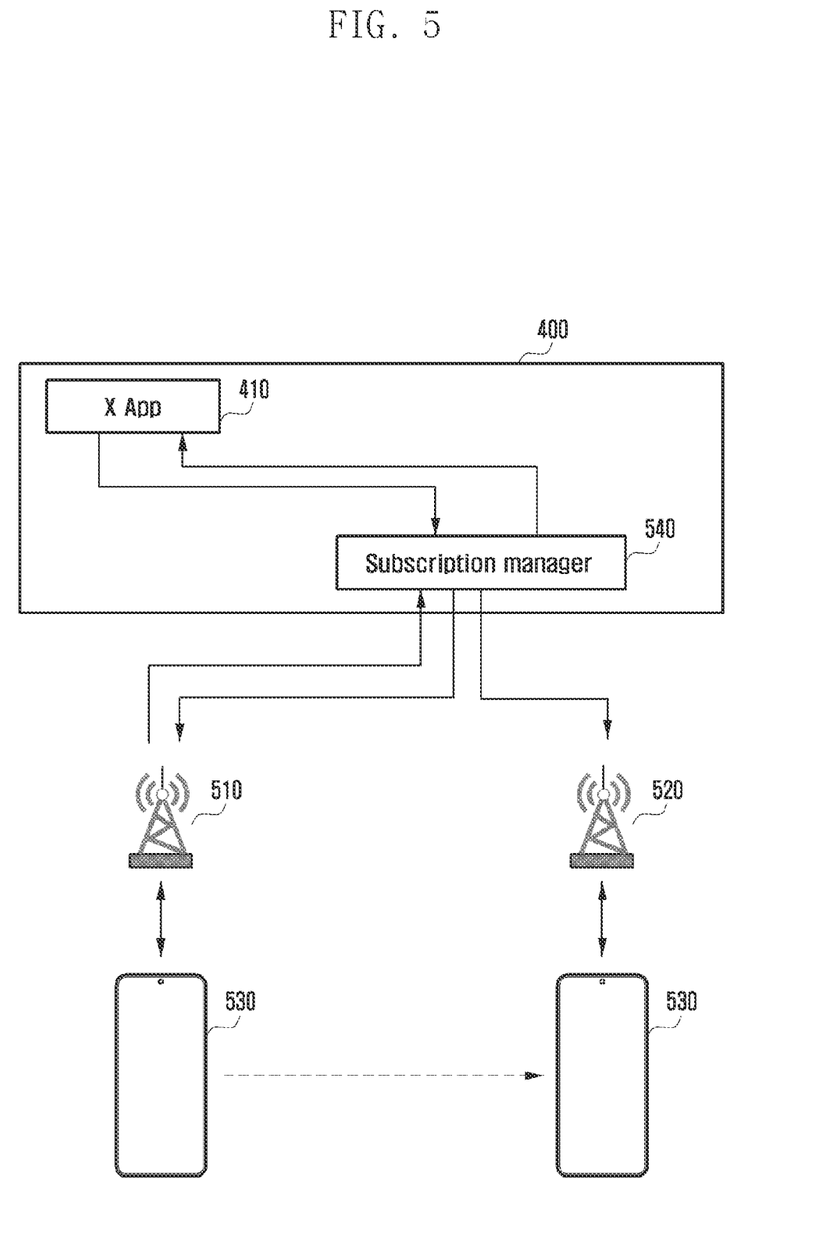
FIG. 5 is a diagram illustrating an embodiment in which the electronic device collects information about a UE according to various example embodiments.

FIG. 5 is a diagram illustrating an embodiment in which the electronic device collects information about a UE according to various example embodiments.

With reference to FIG. 5, the electronic device 400 according to various example embodiments may include an application 410 and a subscription manager 540 (e.g., controller 450 in FIG. 4, comprising processing circuitry).

According to various example embodiments, the application 410 may be a component implemented in the electronic device 400 and performing various functions. The application 410 may perform various functions based on information related to the UE 530 (e.g., UE 120 in FIG. 1) (e.g., location of the UE 530 or base station 510 or 520 connected to the UE 530).

According to various example embodiments, the subscription manager 540 may control various components (e.g., application 410, radio connection management 420 in FIG. 4, mobility management 430 in FIG. 4, and/or QoS management 440 in FIG. 4) implemented on the electronic device 400. The subscription manager 540 may receive a signal for requesting data or functionality required for a specific operation of the application 410 from the application 410. In response to the request signal received from the application 410, the subscription manager 540 may make a request for specific data or functionality to a component capable of providing the data or functionality requested by the application 410 (e.g., radio connection management 420, mobility management 430, and/or QoS management 440). Upon receiving specific data, the subscription manager 540 may forward the data to the application 410 or control a specific component to perform a specified function.

According to various example embodiments, the subscription manager 540 may perform various operations to receive information related to the location of the UE 530 from a base station (e.g., first base station 510 and/or second base station 520) connected to the UE 530.

With reference to FIG. 5, the UE 530 may be in a state being connected to the first base station 510. The subscription manager 540 may perform a subscription procedure with a base station (e.g., first base station 510) connected to the UE 530, so that the base station transmits information related to the location of the UE 530 at specified times. As the subscription procedure with the first base station 510 is completed, the subscription manager 540 may receive information related to the location of the UE 530 from the first base station 510 and forward the information related to the location of the UE 530 to the application 410.

The UE 530 may release a connection with the first base station 510 for various reasons and connect to the second base station 520. The subscription manager 540 may receive information indicating that the UE 530 is handed over to the second base station 520 from the first base station 510. The subscription manager 540 may perform an unsubscription procedure with the first base station 510, which has released a connection with the UE 530, so that the base station having released a connection with the UE 530 does not transmit information related to the location of the UE 530.

As the unsubscription procedure with the first base station 510 is completed, the subscription manager 540 may perform a subscription procedure with the second base station 520 being connected to the UE 530. As the subscription procedure with the second base station 520 is completed, the subscription manager 540 may receive information related to the location of the UE 530 from the second base station 520 and forward the information related to the location of the UE 530 to the application 410.

Figure 6:
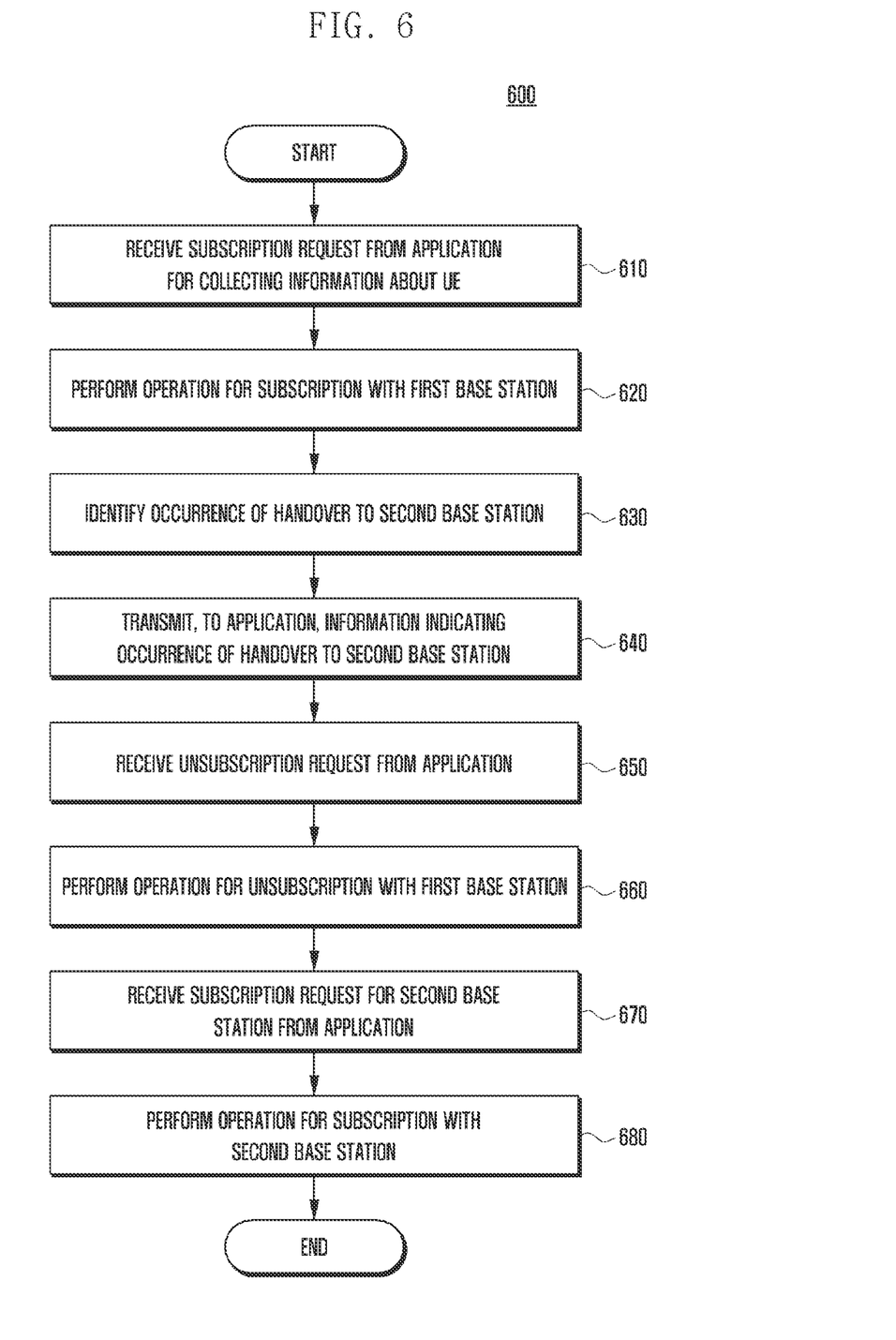
FIG. 6 is a diagram illustrating an embodiment in which the electronic device collects information about a UE according to various example embodiments.

FIG. 6 is a flowchart illustrating an operation method of the electronic device according to various example embodiments.

According to various example embodiments, at operation 610, the subscription manager (e.g., subscription manager 540 in FIG. 5) may receive a subscription request, for collecting information related to the location of a UE (e.g., UE 530 in FIG. 5), from an application (e.g., application 410 in FIG. 5).

According to an embodiment, to perform a specific operation (e.g., executing a specific function that can use the location of the UE 120), the application 410 may transmit, to the subscription manager 540, a signal for requesting a subscription procedure for receiving information related to the location of the UE 530 from a first base station 510.

According to various example embodiments, at operation 620, the subscription manager 540 may perform an operation with the first base station (e.g., first base station 510 in FIG. 5) for subscription to information related to the location of the UE 530.

According to various example embodiments, upon receiving the signal for requesting a subscription procedure from the application 410, the subscription manager 540 may perform a subscription procedure with the first base station 510 currently connected to the UE 530. The subscription procedure may indicate a procedure for the electronic device 400 to receive information related to the location of the UE 530 from the first base station 510. After the subscription procedure is completed, the subscription manager 540 may receive information related to the location of the UE 530 from the first base station 510.

According to various example embodiments, the first base station 510 may transmit information related to the location of the UE 530 to the electronic device 400 in response to satisfaction of a specified condition (e.g., a specified time expires and/or the location of the UE 530 is out of a specified range or more). The information related to the location of the UE 530 may be transmitted to the electronic device 400 through the E2 interface shown in FIG. 3.

According to various example embodiments, the subscription manager 540 may receive the information related to the location of the UE 530 transmitted by the first base station 510. The subscription manager 540 may forward the information related to the location of the UE 530 to the application 410. The application 410 may perform a specific function by using the information related to the location of the UE 120 received from the subscription manager 540.

According to various example embodiments, at operation 630, the subscription manager 540 may identify that the UE 530 is handed over from the first base station 510 to the second base station 520.

According to various example embodiments, the UE 530 may perform a handover in which the connected base station is changed due to various causes (e.g., the UE 120 is moved, or communication quality between the UE 530 and the first base station 510 decreases). According to an embodiment, the UE 530 connected to the first base station may release the connection with the first base station 510 and establish a connection with the second base station 520.

According to various example embodiments, the first base station 510 may transmit information indicating that the UE 120 is handed over to the second base station 520 to the electronic device 400.

According to various example embodiments, at operation 640, the subscription manager 540 may forward the information indicating that a handover is performed to the second base station 520 to the application 410.

Upon receiving the information indicating that the UE 120 is handed over to the second base station 520, the subscription manager 540 may forward the information indicating that the UE 120 is handed over to the second base station 520 to the application 410.

According to various example embodiments, in operation 650, the subscription manager 540 may receive, from the application 410, a request for unsubscription from the first base station 510.

According to various example embodiments, in response to receiving information indicating that the UE 120 is handed over to the second base station 520, the application 410 may transmit, to the subscription manager 540, a request signal for unsubscription from the first base station 510.

According to various example embodiments, in operation 660, the subscription manager 540 may perform an unsubscription operation with the first base station 510. Upon receiving the request signal for unsubscription from the first base station 510 from the application 410, the subscription manager 540 may perform a procedure, for unsubscription from information related to location of the UE 530, with the first base station 510.

According to various example embodiments, at operation 670, the subscription manager 540 may receive a subscription request for the second base station 520 from the application 410.

According to various example embodiments, in response to completion of the procedure of the first base station 510 for unsubscription from information related to the location of the UE 530 between the first base station 510 and the electronic device 400, the application 410 may transmit a signal for requesting a subscription procedure to the subscription manager 540 for receiving information related to the location of the UE 530 from the second base station 520.

According to various example embodiments, at operation 680, the subscription manager 540 may perform an operation with the second base station 520 for subscription to information related to the location of the UE 530.

According to various example embodiments, upon receiving a request signal for a subscription procedure from the application 410, the subscription manager 540 may perform a subscription procedure with the second base station 520 currently connected to the UE 530. The subscription procedure may refer to a procedure for the electronic device 400 to receive information related to the location of the UE 530 from the second base station 520. After the subscription procedure is completed, the subscription manager 540 may receive information related to the location of the UE 530 from the second base station 520.

Referring to the embodiment described above, the application 410 may be implemented to perform a subscription procedure for receiving information related to the location of the UE 530 or an unsubscription procedure. However, when the application 410 is implemented to perform a subscription procedure or unsubscription procedure, the complexity of implementation of the application 410 may increase. Furthermore, when the number of applications 410 implemented on the electronic device 400 increases, the load of the electronic device 400 may increase due to a subscription or unsubscription procedures of the applications 410.

Next, a description is given of an electronic device capable of solving the aforementioned problem by performing a subscription procedure and unsubscription procedure through the subscription manager 540 other than the application 410.

Figure 7:
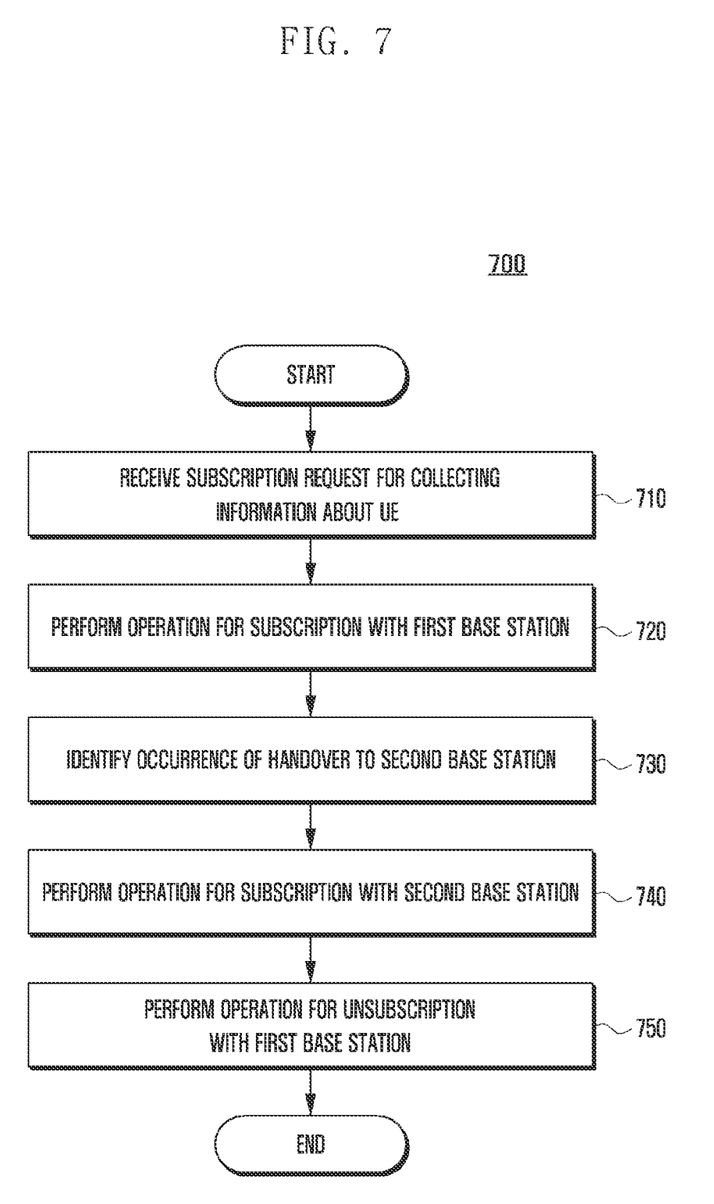
FIG. 7 is a flowchart illustrating an operation method of an electronic device according to various example embodiments.

FIG. 7 is a flowchart illustrating an operation method of an electronic device according to various example embodiments.

According to various example embodiments, at operation 710, the electronic device (e.g., electronic device 400 in FIG. 6, or subscription manager (e.g., subscription manager 540 in FIG. 6)) may receive a subscription request for collecting information about a UE (e.g., UE 530 in FIG. 6) from an application (e.g., application 410 in FIG. 6).

According to various example embodiments, the information about a UE may be information related to the location of the UE 530. The information related to the location of the UE 530 may indicate location information of the UE 530 or information indicating a base station connected to the UE 530.

According to an embodiment, to perform a specific operation (e.g., executing a specific function that can use the location of the UE 120), the application 410 may transmit, to the subscription manager 540, a request signal for a subscription procedure for receiving information related to the location of the UE 530 from the first base station 510.

According to various example embodiments, at operation 720, the electronic device 400 may perform an operation with the first base station (e.g., first base station 510 in FIG. 6) for subscription to receive information about the UE 530.

According to various example embodiments, upon receiving the request signal for a subscription procedure from the application 410, the electronic device 400 may perform a subscription procedure with the first base station 510 currently connected to the UE 530. The subscription procedure may indicate a procedure for the electronic device 400 to receive information related to the location of the UE 530 from the first base station 510. After the subscription procedure is completed, the electronic device 400 may receive information related to the location of the UE 530 from the first base station 510.

According to various example embodiments, the first base station 510 may transmit information related to the location of the UE 530 to the electronic device 400 in response to satisfaction of a specified condition (e.g., a specified time expires and/or the location of the UE 530 is out of a specified range or more). The information related to the location of the UE 530 may be transmitted to the electronic device 400 through the E2 interface shown in FIG. 3.

According to various example embodiments, the subscription manager 540 may receive the information related to the location of the UE 530 transmitted by the first base station 510. The subscription manager 540 may forward the information related to the location of the UE 530 to the application 410. The application 410 may perform a specific function by using the information related to the location of the UE 120 received from the subscription manager 540.

According to various example embodiments, at operation 730, the electronic device 400 may receive, from the first base station 510, information indicating that the UE 530 is handed over to the second base station 520.

According to various example embodiments, the UE 530 may perform a handover in which the connected base station is changed due to various causes (e.g., the UE 120 is moved, or communication quality between the UE 530 and the first base station 510 decreases). According to an embodiment, the UE 530 connected to the first base station 510 may release the connection with the first base station 510 and establish a connection with the second base station 520.

According to various example embodiments, the first base station 510 may transmit information indicating that the UE 120 is handed over to the second base station 520 to the electronic device 400.

According to various example embodiments, the application 410 may be an application in which a function related to mobility management of the UE 530 (or, a function related to subscription management for receiving information related to the location of the UE 530) is not implemented. In this case, the subscription manager 540 may receive the information indicating that the UE 120 is handed over to the second base station 520, and may perform a subscription procedure for receiving information related to the location of the UE 530 from the second base station 520.

According to various example embodiments, the subscription manager 540 may use a subscription list to implement a function related to mobility management of the UE 530 (or, a function related to subscription management for receiving information related to the location of the UE 530). The subscription list may be stored in the memory (not shown) of the electronic device 400. The subscription list may be a list that maps information about the base station from which information related to the location of the electronic device 400 is subscribed (e.g., first base station 510 and/or second base station 520) to information about the UE 530. For example, the subscription list may be implemented as shown in Table 1.

TABLE 1

| Base station information | UE information |
| --- | --- |
| first base station 510 | first UE |
| second base station 520 | second UE |

According to various example embodiments, the subscription manager 540 may receive information indicating handover of the UE 530 and update the subscription list based on the information indicating handover.

According to various example embodiments, at operation 740, the electronic device 400 may perform a subscription operation with the second base station 520 for receiving information about the UE 530.

According to various example embodiments, the subscription manager 540 does not forward the information indicating that the UE 120 is handed over to the second base station 520 to the application 410, and may perform a subscription procedure for receiving information related to the location of the UE 530 from the second base station 520. In this case, the application 410 may not receive information indicating that the UE 120 is handed over to the second base station 520 from the subscription manager 540, and the application 410 may not transmit a separate subscription request signal to the subscription manager 540. The subscription manager 540 may not receive a signal for requesting a subscription procedure with the second base station 530 from the application 410, and may perform a subscription procedure for receiving information related to the location of the UE 530 from the second base station 520.

According to various example embodiments, at operation 750, the electronic device 400 may perform an unsubscription operation with the first base station 510. According to various example embodiments, after completing the subscription procedure for receiving information related to the location of the UE 530 from the second base station 520, the subscription manager 540 may perform an unsubscription procedure with the first base station 510 for information related to the location of the UE 530.

According to various example embodiments, the subscription manager 540 may be a component implemented on the electronic device 400 and may be a logical component implemented with a combination of one or more components, and thus may comprise processing circuitry. For example, the subscription manager 540 may be a logical component that operates in conjunction with various components including the subscription manager defined in the O-RAN.

Referring to the embodiment described above, the application 410 may not implement a function related to mobility management of the UE 530 (or, a function related to subscription management for receiving information related to the location of the UE 530). In this case, since the application 410 does not perform a subscription procedure or an unsubscription procedure, the implementation complexity of the application 410 may be reduced. Further, the number of components (e.g., subscription manager 540) performing subscription management for receiving information related to the location of the UE 530 can be reduced, so that the implementation complexity of the electronic device 400 may also be reduced. In addition, since the number of signals transmitted or received in the subscription or unsubscription procedure can be reduced, resources of the electronic device 400 may be saved.

An electronic device according to various embodiments may include: at least one application that uses information related to a UE; and a subscription manager, wherein the subscription manager may be configured to: receive a subscription request from the application for collecting information about the UE; perform at least one operation for subscription to a first base station connected to the UE; receive, from the first base station, information indicating a handover of the UE to a second base station; perform, in response to receiving the information indicating handover occurrence, at least one operation for subscription to the second base station; and perform at least one operation for unsubscription from the first base station.

The subscription manager according to various embodiments may be configured to perform the at least one operation for subscription to the second base station without transmitting the information indicating handover occurrence to the application.

The subscription manager according to various embodiments may be configured to perform an unsubscription procedure with the first base station after completion of a subscription procedure with the second base station.

The subscription manager according to various embodiments may be configured to receive information about the UE from the second base station, and forward the information about the UE to the application.

The subscription manager according to various embodiments may be configured to perform the at least one operation for subscription to the second base station without receiving a request signal for a subscription procedure with the second base station from the application.

The application according to various embodiments may be configured to receive, from the subscription manager, information indicating that the base station handling a subscription from the UE is changed.

The subscription manager according to various embodiments may be configured to transmit, to the application, information indicating reception of information about the UE from the second base station.

The electronic device according to various embodiments may be connected between the first base station and/or the second base station, and the core network of a cellular network.

The information about the UE according to various embodiments may include information related to mobility management of the UE.

The application according to various embodiments may be an application in which a function related to mobility management of the UE is not implemented.

An operation method of an electronic device according to various example embodiments may include: receiving, from at least application utilizing information related to a UE, a subscription request for collecting information about the UE; performing at least one operation for subscription to a first base station connected to the UE; receiving, from the first base station, information indicating a handover of the UE to a second base station; performing, in response to receiving the information indicating handover occurrence, at least one operation for subscription to the second base station; and performing at least one operation for unsubscription from the first base station.

Performing at least one operation for subscription to the second base station according to various embodiments may include performing the at least one operation for subscription to the second base station without transmitting the information indicating handover occurrence to the application.

Performing at least one operation for unsubscription from the first base station according to various embodiments may include performing an unsubscription procedure with the first base station after completion of a subscription procedure with the second base station.

The operation method of the electronic device according to various embodiments may further include: receiving information about the UE from the second base station; and forwarding the information about the UE to the application.

Performing at least one operation for subscription to the second base station according to various embodiments may include performing the at least one operation for subscription to the second base station without receiving a request signal for a subscription procedure with the second base station from the application.

The application according to various embodiments may be configured to receive, from a subscription manager, information indicating that the base station handling a subscription from the UE is changed.

The operation method of the electronic device according to various embodiments may further include transmitting, to the application, information indicating reception of information about the UE from the second base station.

The electronic device according to various embodiments may be connected, directly or indirectly, between the first base station and/or the second base station, and the core network of a cellular network.

The information about the UE according to various embodiments may include information related to mobility management of the UE.

The application according to various embodiments may be an application in which a function related to mobility management of the UE is not implemented.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device for use in a communication system, the electronic device comprising:
   communication circuitry;
   at least one application configured to use information related to a user terminal; and
   a subscription manager comprising processing circuitry, wherein the subscription manager is configured to:
      receive a subscription request from the application for collecting information about the user terminal;
      perform at least one operation for subscription to a first base station connected to the user terminal;
      receive, from the first base station, information indicating a handover of the user terminal to a second base station;
      perform, in response to receiving the information indicating the handover, at least one operation for subscription to the second base station; and
      perform at least one operation for unsubscription from the first base station.

2. The electronic device of claim 1, wherein the subscription manager is configured to perform the at least one operation for subscription to the second base station without transmitting the information indicating the handover to the application.

3. The electronic device of claim 1, wherein the subscription manager is configured to perform an unsubscription procedure with the first base station after completion of a subscription procedure with the second base station.

4. The electronic device of claim 3, wherein the subscription manager is configured to receive information about the user terminal from the second base station, and forward the information about the user terminal to the application.

5. The electronic device of claim 1, wherein the subscription manager is configured to perform the at least one operation for subscription to the second base station without receiving a request signal for a subscription procedure with the second base station from the application.

6. The electronic device of claim 5, wherein the application is configured to receive, from the subscription manager, information indicating that a base station handling a subscription from the user terminal has changed.

7. The electronic device of claim 1, wherein the subscription manager is configured to transmit, to the application, information indicating reception of information about the user terminal from the second base station.

8. The electronic device of claim 1, wherein the electronic device is connected between (i) the first base station and/or the second base station, and (ii) a core network of a cellular network.

9. The electronic device of claim 1, wherein the information about the user terminal includes information related to mobility management of the user terminal.

10. The electronic device of claim 1, wherein the application is an application in which a function related to mobility management of the user terminal is not implemented.

11. An operation method of an electronic device for use in a communication network, the operation method comprising:
   receiving, from at least application utilizing information related to a user terminal, a subscription request for collecting information about the user terminal;
   performing at least one operation for subscription to a first base station connected to the user terminal;
   receiving, from the first base station, information indicating a handover of the user terminal to a second base station;
   performing, in response to receiving the information indicating the handover, at least one operation for subscription to the second base station; and
   performing at least one operation for unsubscription from the first base station.

12. The operation method of claim 11, wherein performing at least one operation for subscription to the second base station comprises performing the at least one operation for subscription to the second base station without transmitting the information indicating handover occurrence to the application.

13. The operation method of claim 11, wherein performing at least one operation for unsubscription from the first base station comprises performing an unsubscription procedure with the first base station after completion of a subscription procedure with the second base station.

14. The operation method of claim 13, further comprising:
   receiving information about the user terminal from the second base station; and
   forwarding the information about the user terminal to the application.

15. The operation method of claim 11, wherein performing at least one operation for subscription to the second base station comprises performing the at least one operation for subscription to the second base station without receiving a request signal for a subscription procedure with the second base station from the application.

* * * * *